(12) United States Patent
Inon

(10) Patent No.: US 11,936,674 B2
(45) Date of Patent: Mar. 19, 2024

(54) IDENTIFY AND PREVENT ACCOUNT TAKE OVER FRAUD ATTACKS

(71) Applicant: SAP SE, Walldorf (DE)

(72) Inventor: Gadi Inon, Tel Aviv (IL)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 17/457,783

(22) Filed: Dec. 6, 2021

(65) Prior Publication Data

US 2023/0179612 A1 Jun. 8, 2023

(51) Int. Cl.
*H04L 9/40* (2022.01)
(52) U.S. Cl.
CPC .......... *H04L 63/1425* (2013.01); *H04L 63/10* (2013.01); *H04L 2463/144* (2013.01)
(58) Field of Classification Search
None
See application file for complete search history.

(56) References Cited

U.S. PATENT DOCUMENTS

2021/0051176 A1\* 2/2021 Stolfo ................. H04L 63/1491

\* cited by examiner

*Primary Examiner* — Cai Y Chen
(74) *Attorney, Agent, or Firm* — Fish & Richardson P.C.

(57) ABSTRACT

This application provides an example method, system, and computer-readable medium for identifying potential account take over fraud attacks through monitoring of user credential login attempts across a network of websites. One example method includes identifying a login attempt to a particular website. The method further includes determining whether the login user credentials correspond to site-specific user credentials for the particular website. The method also includes in response to determining that the login user credentials correspond to the site-specific user credentials, determining whether the login attempt to the particular website is allowed by a first allowance rule associated with the first RTW, and in response to determining that the login attempt to the particular website is allowed by the first allowance rule, setting a first allowance indicator to indicate that the login attempt to the particular website is to be allowed by the first allowance rule.

20 Claims, 10 Drawing Sheets

Evaluation of Login Attempts with a Rolling Time Window using Rules 126

| | Example 1 – Evaluation of Login Attempts with RTW 120-1 |
|---|---|
| Assumptions | Total Failed Count Value = Sum of FC 144-13 + each FC 144 of each Window Slot 134-12 to 134-1 = 200 Failed Login Attempts<br>Total Valid Count Value = Sum of VC 142-13 + each VC 142 of each Window Slot 134-12 to 134-1 = 1 Valid Login Attempts<br>Valid Threshold = VT 130-1 = 1 Valid Login Attempt and Failed Threshold = FT 132-1 = 100 Failed Login Attempts |
| Rules 126 | Allowance Rule 127 - Allow Current Login Attempt if:<br>    Total Valid Count Value >= VT 130-1 and<br>    Total Failed Count Value > FT 132-1 | Block Rule 128 - Block Current Login Attempt if:<br>    Total Valid Count Value < VT 130-1 and<br>    Total Failed Count Value > FT 132-1 |
| Evaluation Results | The Login Attempt is to be Allowed by Allowance Rule 127 |

| | Example 2 – Evaluation of Login Attempts with RTW 120-1 |
|---|---|
| Assumptions | Total Failed Count Value = Sum of FC 144-13 + each FC 144 of each Window Slot 134-12 to 134-1 = 200 Failed Login Attempts<br>Total Valid Count Value = Sum of FC 142-13 + each VC 142 of each Window Slot 134-12 to 134-1 = 0 Valid Login Attempts<br>Valid Threshold = VT 130-1 = 1 Valid Login Attempt and Failed Threshold = FT 132-1 = 100 Failed Login Attempts |
| Rules 126 | Allowance Rule 127 - Allow Current Login Attempt if:<br>    Total Valid Count Value >= VT 130-1 and<br>    Total Failed Count Value > FT 132-1 | Block Rule 128 - Block Current Login Attempt if:<br>    Total Valid Count Value < VT 130-1 and<br>    Total Failed Count Value > FT 132-1 |
| Evaluation Results | The Login Attempt is to be Blocked by Block Rule 128 |

FIG. 2B

| Evaluation of Login Attempts with multiple RTWs using Rules 326—Apply each Pair of allowance rules 327 and Block Rules 328 in Parallel or Sequentially | | |
|---|---|---|
| Assumptions for RTW 320-1 | Total Failed Count Value = Sum of FC 344-13 + FCs 344 of Window Slot 334-10 to 334-1 = 40 Failed Login Attempts<br>Total Valid Count Value = Sum of VC 342-13 + VCs 342 of Window Slot 334-10 to 334-1 = 0 Valid Login Attempts<br>Valid Threshold = VT 330-1 = 1 Valid Login Attempt and Failed Threshold = FT 332-1 = 50 Failed Login Attempts | |
| Rules 326-1 | Allowance Rule 327-1 - Allow Current Login Attempt if:<br>Total Valid Count Value >= VT 330-1 and<br>Total Failed Count Value > FT 332-1 | Block Rule 328-1 - Block Current Login Attempt if:<br>Total Valid Count Value < VT 330-1 and<br>Total Failed Count Value > FT 332-1 |
| Assumptions for RTW 320-2 | Total Failed Count Value = Sum of FC 344-13 + FCs 344 of Window Slot 334-7 to 334-1 = 70 Failed Login Attempts<br>Total Valid Count Value = Sum of VC 342-13 + VCs 342 of Window Slot 334-7 to 334-1 = 0 Valid Login Attempts<br>Valid Threshold = VT 330-2 = 1 Valid Login Attempt and Failed Threshold = FT 332-2 = 50 Failed Login Attempts | |
| Rules 326-2 | Allowance Rule 327-2 - Allow Current Login Attempt if:<br>Total Valid Count Value >= VT 330-2 and<br>Total Failed Count Value > FT 332-2 | Block Rule 328-2 - Block Current Login Attempt if:<br>Total Valid Count Value < VT 330-2 and<br>Total Failed Count Value > FT 332-2 |
| Assumptions for RTW 320-3 | Total Failed Count Value = Sum of FC 344-13 + FCs 344 of Window Slot 334-4 to 334-1 = 90 Failed Login Attempts<br>Total Valid Count Value = Sum of VC 342-13 + VCs 342 of Window Slot 334-4 to 334-1 = 1 Valid Login Attempts<br>Valid Threshold = VT 330-3 = 2 Valid Login Attempt and Failed Threshold = FT 332-3 = 50 Failed Login Attempts | |
| Rules 326-3 | Allowance Rule 327-3 - Allow Current Login Attempt if:<br>Total Valid Count Value >= VT 330-3 and<br>Total Failed Count Value > FT 332-3 | Block Rule 328-3 - Block Current Login Attempt if:<br>Total Valid Count Value < VT 330-3 and<br>Total Failed Count Value > FT 332-3 |
| Assumptions for RTW 320-4 | Total Failed Count Value = Sum of FC 344-13 + FCs 344 of Window Slot 334-1 to 334-1 = 110 Failed Login Attempts<br>Total Valid Count Value = Sum of VC 342-13 + VCs 342 of Window Slot 334-1 to 334-1 = 3 Valid Login Attempts<br>Valid Threshold = VT 330-4 = 3 Valid Login Attempt and Failed Threshold = FT 332-4 = 100 Failed Login Attempts | |
| Rules 326-4 | Allowance Rule 327-4 - Allow Current Login Attempt if:<br>Total Valid Count Value >= VT 330-4 and<br>Total Failed Count Value > FT 332-4 | Block Rule 328-1 - Block Current Login Attempt if:<br>Total Valid Count Value < VT 330-4 and<br>Total Failed Count Value > FT 332-4 |
| Results for each of Rules 326 | Neither to be Allowed nor Blocked by Allowance Rule 326-1 and Block Rule 328-1, to be Blocked by Block Rule 328-2, to be Blocked by Block Rule 328-3, and to be Allowed by Allowance Rule 327-4 | |
| Overall Results | The Login Attempt is Allowed by Allowance Rule 327-4 in Parallel Evaluation of Rules 326-1 to 326-4 | The Login Attempt is Blocked by Block Rule 328-2 in Sequential Evaluation of Rules 326-1 to 326-4 |

FIG. 3B

IDENTIFY AND PREVENT ACCOUNT TAKE OVER FRAUD ATTACKS

BACKGROUND

Cyber attacks are malicious and deliberate attempts by individuals or organizations to breach information systems and user accounts of another individual or organization. Such attacks may be an attempt to gain personally identifiable information (PII) that may allow financial- or privacy-related intrusions upon various persons and entities. Cyber attacks may include, but are not limited to, denial-of-service (DoS) and distributed DoS (DDoS) attacks, man-in-the-middle (MitM) attacks, account take over (ATO) attacks, and others.

An ATO attack is an attack where a hacker attempts to discover credential sets by using brute-force techniques that rely upon a large volume of access attempts. Most ATO attempts rely on bots, which are software applications that are programmed to do certain tasks. These bots are programmed to break into user accounts, target websites, or systems, and usually operate over a network. They attempt to access a target website or system, continually submitting potential credentials to log into or access data from the target website or system, noting the credentials that are successful. The inputs used by the bots may be randomly generated, or could be based on lists of common words, names, and/or passwords.

SUMMARY

The present disclosure describes methods, systems, and software for identifying potential account take over fraud attacks through monitoring of user credential login attempts across a network of websites. In one implementation, a computer-implemented method is used for identifying potential account take over (ATO) fraud attacks through monitoring of user credential login attempts across a network of websites. A centralized authentication evaluation system (CAES) monitors login attempts associated with a set of websites. A login attempt to a particular website of the set of websites is identified. The login attempt is associated with login user credentials and a login internet protocol (IP) address of a client device. Whether the login user credentials correspond to site-specific user credentials of a set of site-specific user credentials for the particular website is determined. In response to determining that the login user credentials correspond to the site-specific user credentials, a current valid count value associated with a current IP address in a list of IP addresses of a current window slot (WS) of a current rolling time window (RTW) is incremented. The login IP address matches the current IP address, and the current IP address is associated with the current valid count value and a current failed count value. A total valid count value and a total failed count value are determined based on the current valid count value, the current failed count value, and a WS valid count value and a WS failed count value associated with a WS IP address in a list of IP addresses of each respective WS of a set of WSs within a first RTW that matches the login IP address. Whether the login attempt to the particular website is allowed by a first allowance rule associated with the first RTW is determined. The login attempt is allowed by the first allowance rule if the total valid count value is greater than or equal to a valid count threshold of the first allowance rule and the total failed count value is greater than a failed count threshold of the first allowance rule. In response to determining that the login attempt to the particular website is allowed by the first allowance rule, a first allowance indicator is set to indicate that the login attempt to the particular website is to be allowed by the first allowance rule.

In some instances, determining the total valid count value and the total failed count value includes setting the total valid count value to the current valid count value and the total failed count value to the current failed count value. For each WS of the set of WSs within the first RTW, determining whether the login IP address matches a WS IP address in a list of IP addresses of a respective WS. And, in response to determining that the login IP address matches the WS IP address in the list of IP addresses of the respective WS, adding the WS valid count value to the total valid count value and the WS failed count value to the total failed count value.

In some instances, in response to determining that the login user credentials do not correspond to the site-specific user credentials, incrementing the current failed count value associated with the current IP address in the list of IP addresses of the current WS of the current RTW. Determining a total valid count value and a total failed count value based on the current valid count value, the current failed count value, and a WS valid count value and a WS failed count value associated with a WS IP address in a list of IP addresses of each respective WS of a set of WS s within a first RTW that matches the login IP address. Determining whether the login attempt to the particular website is blocked by a first block rule associated with the first RTW. The login attempt is blocked by the first block rule if the total valid count value is less than the valid count threshold of the first block rule and the total failed count value is greater than the failed count threshold of the first block rule. In response to determining that the login attempt to the particular website is blocked by the first block rule, setting a first block indicator to indicate that the login attempt to the particular website is to be blocked by the first block rule.

In some instances, determining whether the login attempt to the particular website is allowed by a second allowance rule associated with a second RTW. In response to determining that the login attempt to the particular website is allowed by the second allowance rule, setting a second allowance indicator to indicate that the login attempt to the particular website is to be allowed by the second allowance rule.

In some instances, determining whether the login attempt to the particular website is blocked by a second block rule associated with the second RTW. In response to determining that the login attempt to the particular website is blocked by the second block rule, setting a second block indicator to indicate that the login attempt to the particular website is to be blocked by the second block rule.

In some instances, in response to determining that at least one of the first allowance indicator or the second allowance indicator indicates that the login attempt to the particular website is to be allowed, allowing the login attempt to the particular website associated with the login user credentials to proceed. In response to determining that neither the first allowance indicator nor the second allowance indicator indicates that the login attempt to the particular website is to be allowed, and that at least one of the first block indicator or the second block indicator indicates that the login attempt to the particular website is to be blocked, blocking the login attempt to the particular website associated with the login user credentials from proceeding.

In some instances, in response to determining that the first allowance indicator indicates that the login attempt to the particular website is to be allowed, allowing the login attempt to the particular website associated with the login user credentials to proceed. In response to determining that the first block indicator indicates that the login attempt to the particular website is to be blocked, blocking the login attempt to the particular website associated with the login user credentials from proceeding. In response to determining that the second allowance indicator indicates that the login attempt to the particular website is to be allowed, allowing the login attempt to the particular website associated with the login user credentials to proceed. In response to determining that the second block indicator indicates that the login attempt to the particular website is to be blocked, blocking the login attempt to the particular website associated with the login user credentials from proceeding.

In some instances, the set of websites includes the particular website. The set of websites comprises one of all registered websites in the centralized authentication evaluation system, all registered websites associated with a particular data center in the centralized authentication evaluation system, all registered websites associated with a particular customer in the centralized authentication evaluation system, all registered websites associated with a particular group of sites in the centralized authentication evaluation system, or a particular registered website in the centralized authentication evaluation system.

In some instances, in response to determining that the login user credentials do not correspond to the site-specific user credentials and the login IP address does not exist in the list of IP addresses of the current WS, adding the login IP address to a new IP address entry in the list of IP addresses of the current WS. The list of IP addresses is associated with the set of websites. Setting a failed count of the new IP address entry to a value of zero. In response to determining that a duration of the current WS has been reached and the login IP address is in the list of IP addresses of the current WS, in response to determining that a number of WSs in the set of WSs is equal to a WSs threshold of the set of WSs, removing the oldest WS from the set of WSs based on a time each WS was added to the set of WSs. Creating a new WS including setting a valid count of the new WS to the value of zero, adding each IP address entry in the current WS and each IP address entry in the set of WSs to a list of IP addresses in the new WS, setting a failed count of each IP address entry in the list of IP addresses in the new WS to the value of zero, adding the current WS as the most recent WS to the set of WSs, and assigning the new WS to the current WS.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages.

First, the centralized authentication evaluation system may incorporate new and enhanced protections of accounts, websites, and systems while preventing legitimate users from having their accounts being locked out, blocked, or unnecessarily challenged based on an analysis of successful and failed login attempts, such as those resulting during an ATO fraud attack.

Second, the centralized authentication evaluation system can allow multiple websites to benefit from the determinations in real-time.

Third, valid login attempts and failed login attempts are tracked by an IP address associated with each login attempt, where an attacker cannot fake the IP address associated with each login attempt.

Fourth, allowance rules and block rules may be defined that allows a legitimate user to be allowed to login to a particular site based on the legitimate user's login behavior, while illegitimate users are blocked from accessing a particular site based on the illegitimate user's login behavior.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIGS. 2A and 2B illustrate example evaluations to determine whether to allow or block a login attempt based on login user credentials, login internet protocol (IP) addresses, allowance and block rules, and a single rolling time window history of successful and failure login behavior, according to an example implementation of the present disclosure.

FIGS. 3A and 3B illustrate example evaluations to determine whether to allow or block a login attempt based on login user credentials, login IP addresses, allowance and block rules, and multiple rolling time windows history of successful and failure login behavior, according to an example implementation of the present disclosure.

DETAILED DESCRIPTION

Figure 1:
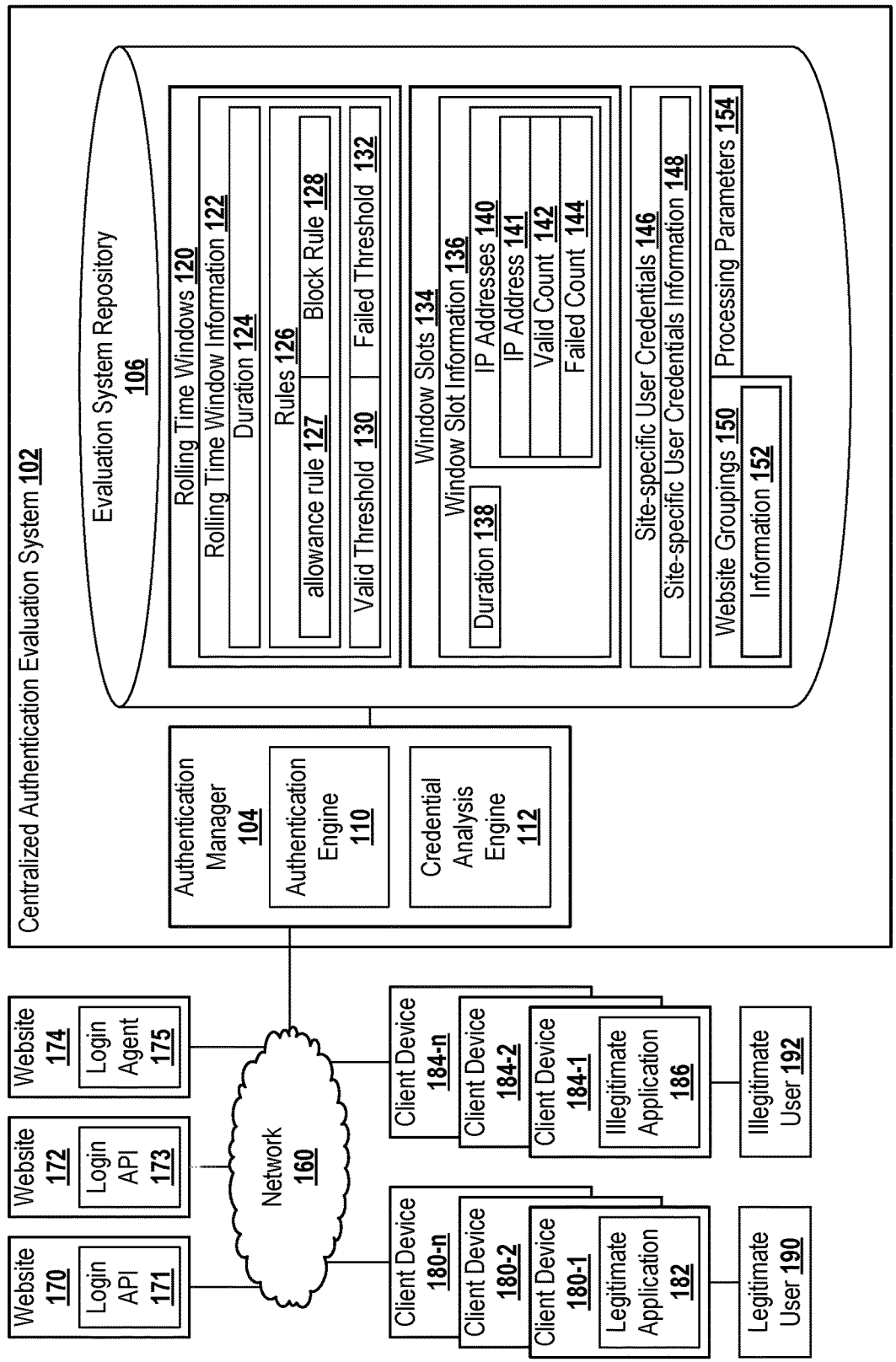
FIG. 1 is a block diagram illustrating an example centralized authentication evaluation system for identifying potential attacks through monitoring of user credential login attempts across a network of websites, according to an example implementation of the present disclosure.

The following detailed description describes various tools and techniques for identifying potential account take over (ATO) fraud attacks through monitoring of user credential login attempts across a network of websites, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In some types of attacks, attackers do not know credentials to accounts, websites, or systems. To access the protected information and accounts, the attackers may attempt an ATO fraud attack to discover these particular credential sets by using brute-force techniques. For example, attackers may attempt to break into an account, website, or system using bots programmed to continually submit potential credentials to log into or access data from the account, website, or system until successful credential sets are found. These bots may operate over a network, and may utilize hundreds or thousands of systems in the attack.

Traditional credential protection mechanisms are designed to defend against brute-force attacks that target a single account, particularly when many different credential sets are being tried in hopes of finding a single successful one. Once an ATO fraud attack is identified, these traditional protection mechanisms may lock out or block access to the account for a specified period of time, force a user to pass Two-Factor Authentication (TFA), force a user to pass a CAPTCHA (Completely Automated Public Turing test to tell Computers and Humans Apart), or ask the user to attempt and pass another suitable type of challenge-response test. During this specified period of time, however, a legitimate user may also be locked out or blocked from accessing their account.

Methods and system for identifying potential account take over (ATO) fraud attacks through monitoring user credential login attempts across a network of websites are disclosed herein. As described, a centralized authentication evaluation system may be provided to enhance the protection of accounts, websites, and systems from potential ATO fraud attacks, and to prevent legitimate users from having their accounts being locked out, blocked, or unnecessarily challenged. The centralized authentication evaluation system may monitor user credential login attempts across a network of websites. Each login attempt at a particular website or through a potential entry point may be identified based on associated login user credentials and a login IP address of a system or device being used in the attempt. The centralized authentication evaluation system may determine, for each login attempt, whether the user credentials corresponds to a site-specific set of user credentials for the particular website. Based on the determination for each login attempt, the number of times that the user credentials matches the site-specific user credentials for the particular website (i.e., valid counts) may be tracked in one or more window slots managed by the centralized authentication evaluation system. The number of times that the user credentials fails to match (i.e., failed counts) may also be tracked in the one or more window slots. Each of the one or more window slots may be associated with one or more IP addresses of the system(s) being used in these attempts. The centralized authentication evaluation system may use information associated with the attempts, including the valid and failed counts, to determine the success and failure behavior of these login attempts. The success behavior of the login attempts may be utilized to allow access to a legitimate user of the particular website, while the failure behavior may be used to prevent illegitimate users from obtaining access to the website.

FIG. 1 is a block diagram illustrating an example system 100 for identifying potential ATO fraud attacks through monitoring of user credential login attempts across a network of websites, according to an example implementation of the present disclosure. System 100 includes functionality and structure associated with a networked set of websites 170, 172, and 174, where authentication to the websites are managed by an example centralized authentication evaluation system (CAES) 102. The CAES 102 monitors user credential login attempts for the plurality of websites to assist in determining whether ATO fraud attacks associated with many different user credentials are targeting one or more accounts in real time. The CAES 102 can include or provide protections available in existing solutions (for example, locking out or blocking access to the account for a specified period of time, and forcing a user to pass TFA, a CAPTCHA, or another type of challenge-response test, among others). The CAES 102 can incorporate new and enhanced protections of accounts while preventing legitimate users from having their accounts being locked out, blocked, or unnecessarily challenged based on an analysis of successful and failed login attempts, such as those resulting during an ATO fraud attack. Further, the CAES 102 can allow multiple websites to benefit from the determinations in real-time.

As illustrated, system 100 includes or is communicably coupled with the CAES 102, a plurality of websites 170, 172, and 174, at least one client device 180 used by or associated with a legitimate user 190, and at least one client device 184 utilized by an illegitimate user 192, where those elements are each connected through network 160. In some instances, no legitimate users 190 may be present at some times, while in others, no illegitimate users 192 may be present. Additionally, multiple legitimate users 190 and/or multiple illegitimate users 192 may be present at various times during system execution and interaction. The illustrated CAES 102 includes or is made up of one or more communicably coupled computers or other components (see, for example, FIG. 5 described later).

The CAES 102, as illustrated, includes an authentication manager 104 and an evaluation sytem repository 106. The authentication manager 104 may be any suitable application, program, or other component. In general, the authentication manager 104 can monitor login attempts associated with a particular website grouping 150. The particular website grouping 150 may include information 152 including a set of websites to be monitored, which may include one or more of a plurality of websites registered with the CAES 102. In the illustrated example, one or more of websites 170, 172, and 174 may be included in one particular website grouping 150. As an example, the group of websites being monitored may comprise one or more websites registered with the CAES 102, one or more registered websites associated with a particular data center in the CAES 102, one or more registered websites associated with a particular customer in the CAES 102, or one or more registered websites associated with a particular group of sites in the CAES 102, or a particular registered website in the CAES 102.

The authentication manager 104 can identify a login attempt to a particular registered website. The login attempt may be associated with login user credentials and a login IP address of a client device, including a client device 180 or client device 184, attempting the login. The authentication manager 104 can perform operations previously performed by the websites themselves as they relate to user management and authentication operations. Information about various user accounts of each website can be stored in site-specific user credentials 146, which can each be specifically associated with a particular website, and that traditionally were maintained locally by the corresponding website. In some implementations, the CAES 102 allows system administrators to outsource such operations to a remote CAES 102, obtaining the benefits of using the remote CAES 102 as a cloud-based resource and minimizing local needs for managing the respective website. Each of the site-specific user credentials 146, as illustrated, may include site-specific user credentials information 148 identifying the users and accepted current credentials for those users.

Returning to the authentication manager 104, an authentication engine 110 can be used to determine whether the identified login user credentials and the login IP address of a client device for a particular website matches the particular credentials of a set of site-specific user credentials for the particular website from the corresponding site-specific user credentials 146. In other words, a determination is made as to whether the attempted login corresponds to an existing valid set of user credentials.

The authentication engine 110 can be used to determine whether the login IP address matches a current IP address in a current window slot stored in a plurality window slots 134. Each of the plurality window slots 134 may include window slot information 136 including a duration of time 138 and a list of IP addresses 140 associated with the respective window slot 134. An IP address entry in each list of IP addresses 136 includes an IP address 141, and a valid count 142 and a failed count 144 associated with the IP address 141. In some instances, there may be some proxy between the user and CAES 102 system, where the received IP address is that of the proxy, while the source IP address can be forwarded in a different https header. In other instances, an organization may be a company or university in which many users are being sent to the external world, with many users sharing the same IP address. In those cases, ending blocking after a successful attempt may allow implementations to still block invalid attempts and IP addresses, but re-allowing those IP addresses after a successful attempt.

In response to determining that the login IP address matches the current IP address 141 in the list of IP addresses 140 in the current window slot 134, and that the identified login user credentials and the login IP address of the client device for the particular website matches the particular credentials the authentication engine, a current valid count value 142 associated with the current IP address 141 may be incremented by the authentication engine 110.

If the login IP address matches the current IP address 141 in the list of IP addresses 140 in the current window slot 134, and the identified login user credentials do not match the corresponding site-specific user credentials 146, the authentication engine 110 can increment a failed count value of a failed count 144 associated with the current window slot 134. The failed count 144 may be associated with the particular website grouping 150.

The credential analysis engine 112 can analyze the respective information 136 of the current window slot 134, and each of the window slots 134 within a first rolling time window 120 to determine a total valid count value and a total failed count value for the current window slot 134 and each of the window slots 134 within the first rolling time window 120. The credential analysis engine 112 may initially set the total valid count value to the current valid count value and the total failed count value to the current failed count value.

Then, the authentication engine 110 may, for each window slot 134 of the plurality window slots 134 within a first rolling time window 120, determine whether the login IP address matches a window slot IP address 141 in a list of IP addresses 140 of the respective window slot 134. The window slot IP address 141 may be associated with a window slot valid count value 142 and a window slot failed count value 144.

In response to determining that the login IP address matches the window slot IP address 142 in the list of IP addresses 140 of the respective window slot 134, the window slot valid count value may be added to the total valid count value and the window slot failed count value may be added to the total failed count value.

The credential analysis engine 112 can analyze the information 136 of the current window slot 134 and information 122 of a first rolling time window 120 to determine whether the current login attempt would be allowed by rules 126 corresponding to the first rolling time window 120. The login attempt would be allowed by the credential analysis engine 112 based on allowance rules 127 of the rules 126, where the allowance rules 127 consider and evaluate a valid threshold 130, and a failed threshold 132 of the first rolling time window 120, the total valid count value, and the total failed count value.

For example, the credential analysis engine 112 may evaluate the current login attempt using the allowance rule 127. The current login attempt would be allowed by a particular allowance rule 127 if the total failed count value is greater than the failed threshold 132 and the total valid count value is greater than or equal to the valid threshold 130. In response to determining that the login attempt would be allowed by allowance rule 127, the credential analysis engine 112 can set an indicator of the allowance rule 127 to indicate that the login attempt would be allowed by the allowance rule 127 of the first rolling time window 120.

In response to determining that the login attempt would not be allowed by allowance rule 127, the credential analysis engine 112 can determine whether the current login attempt would be blocked by a block rule 128 of the rules 126 of the first rolling time window 120. The credential analysis engine 112 would block the login attempt based on the block rule 128, where the block rule 128 considers and evaluates the valid threshold 130 and the failed threshold 132 of the first rolling time window 120, and the valid count 142 and the failed count 144 of the current window slot 134. For example, the credential analysis engine 112 may evaluate the current login attempt using the block rule 128 and determine that the current login attempt would be blocked if the failed count 144 is greater than the failed threshold 132 and the valid count 142 is less than the valid threshold 130. In response to determining that the login attempt would be blocked by the block rule 128, the credential analysis engine 112 can set an indicator of the block rule 128 to indicate that the login attempt would be blocked by the block rule 128 of the first rolling time window 120.

Similarly, the credential analysis engine 112 may also, in some instances, determine whether the current login attempt would be allowed or blocked by each of the one or more rules 126 of each of the corresponding one or more rolling time windows 120. Each of the one or more rolling time windows 120 comprises information 122 that includes a duration 124, rules 126, a valid threshold 130, and a failed threshold 132, which each may be set to the same or different values than each of the other rolling time windows 120.

In response to determining that the current login attempt would be allowed by one or more allowance rules 127 of the one or more corresponding rolling time windows 120, the credential analysis engine 112 can set an indicator in the one or more allowance rules 127 to indicate that the login attempt would be allowed by the one or more allowance rules 127 of the one or more corresponding rolling time windows 120.

In response to determining that the current login attempt would not be allowed by any of the allowance rules 127 of the one or more rolling time windows 120 and that the current login attempt would be blocked by one or more block rules 128 of the one or more corresponding rolling time windows 120, the credential analysis engine 112 can set an indicator in the one or more block rules 128 to indicate that the login attempt would be blocked by the one or more block rules 128 of the one or more corresponding rolling time windows 120.

In some instances, the credential analysis engine 112 may process each pair of the allowance rule 127 and the block rule 128 of rules 126 sequentially, where each pair of the rules 126 are processed one after another. Once a particular allowance rule 127 in the sequence indicates that the current login attempt would be allowed, the current login attempt would be allowed to proceed and the evaluation of any remaining rules 126 would stop. Alternatively, or additionally, once a particular block rule 128 of the pair of rules 126 in the sequence indicates that the current login attempt would be blocked, the current login attempt would be blocked and not allowed to proceed, and the evaluation of any remaining rules 126 would stop.

Alternatively, in other instances, the credential analysis engine 112 may process each pair of the allowance rules 127 and the block rules 128 of rules 126 in parallel. In response to determining at least one of the allowance rules 127 indicates that the current login attempt would be allowed, the current login attempt would be allowed to proceed and any remaining processing of any remaining pairs of rules 126 would be stopped. In these other alternative instances, the remaining processing would be stopped even if at least one of the block rules 128 indicates that the current login attempt would be blocked because, in these alternative instances, the allowance of the current login attempt by the at least one of the allowance rules 127 takes precedence over blocking the current login attempt by the at least one of the block rules 128.

In response to determining that none of the allowance rules 127 indicates that the current login attempt would be allowed, and, further, that at least one of the block rules 128 indicates that the current login attempt would be blocked, then the current login attempt would be blocked from proceeding. Any remaining processing of any remaining rules 126 would be stopped.

In some instances, the credential analysis engine 112 may determine when an IP address is to be inserted into a window slot 134. Such determinations can be based on a set of IP address insertion rules.

In response to determining that the login user credentials do not correspond to the site-specific user credentials 146 for the particular website and that the login IP address of the client device (e.g., of client device 180 or 184) associated with the login attempt does not exist in the IP addresses 140 in the current window slot 134, the credential analysis engine 112 may add the login IP address of the client device associated with the login attempt to the set of IP addresses 140 in the current window slot 134. The IP addresses 140 can be specifically associated with websites in the website groupings 150. Additionally, the credential analysis engine 112 may set a failed count 142 associated with the new IP address in the IP addresses 140 to a value of zero.

In response to determining that the duration 124 of the current window slot 134 has been reached, and that the login IP address of the client device associated with the current login attempt is in the current window slot 134 and a number of window slots in the windows slots 134 up to a maximum number of window slots to be maintained minus one, and in response to determining that the number of window slots in the window slots 134 is equal to the maximum number of window slots of the window slots 134 to be maintained, perform a set of actions. The set of actions to be performed include: removing a tail window slot 134 from a tail in the window slots 134, creating a new window slot 134 including setting a valid count 142 of the new window slot 134 to the value of zero, adding each IP address in the current window slot 134 and each IP address in the window slots 134 to a new IP address in the IP addresses 140 in the new window slot 134, setting a failed count 144 of each IP address in the IP addresses 140 in the new window slot 134 to the value of zero, adding the current window slot 134 to a head window slot 134 of a head of the window slots 134, and assigning the new window slot 134 to the current window slot 134, among others.

Figure 2A:
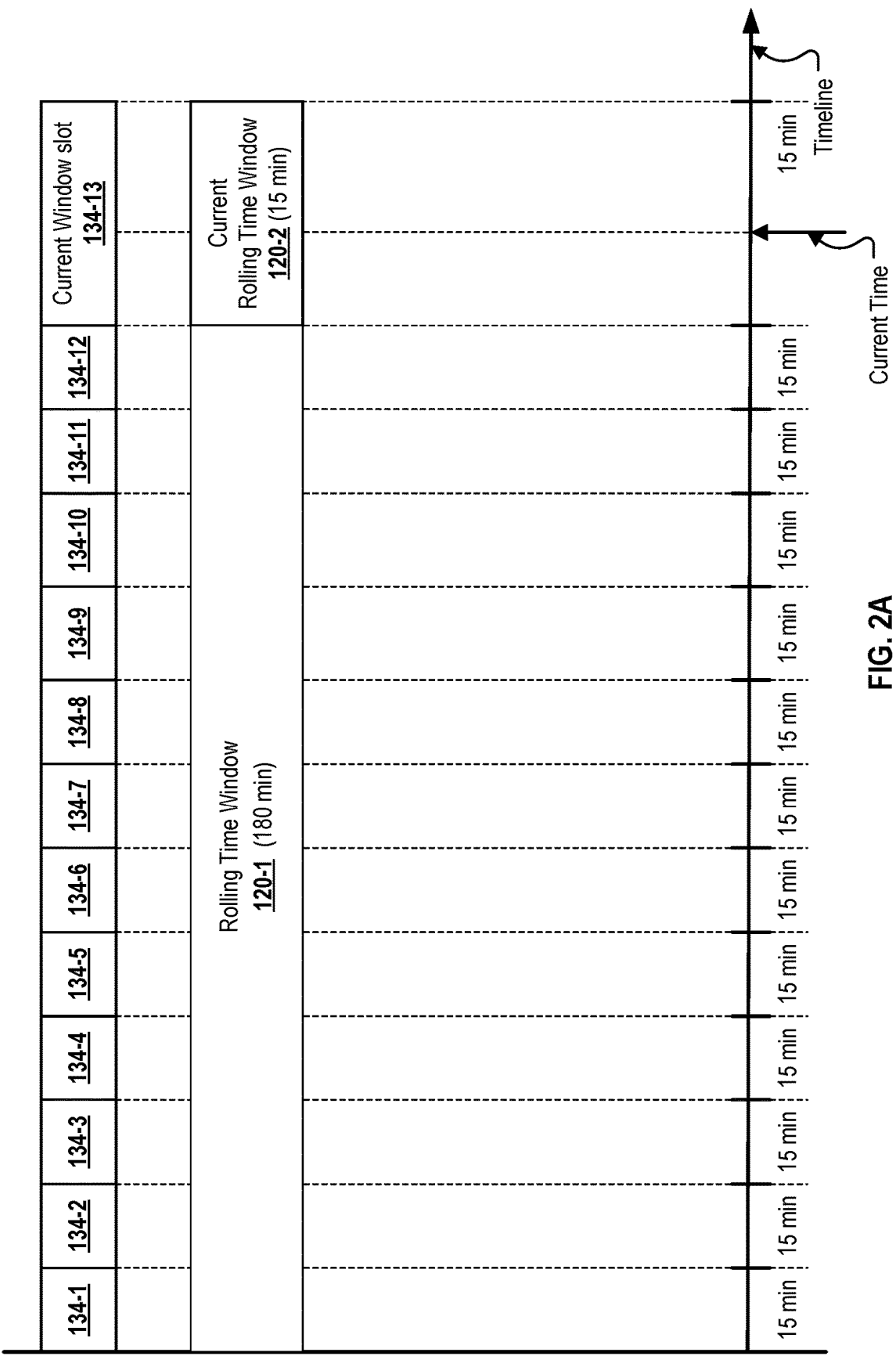

FIGS. 2A and 2B illustrate example evaluations to determine whether to allow or block a login attempt based on login user credentials, login IP addresses, allowance and block rules, and a single rolling time window history of successful and failure login behavior, according to an implementation of the present disclosure.

FIG. 2A shows a current rolling time window 120-2 including a current window slot 134-13, and a rolling time window 120-1 including window slots 134-1 to 134-12. The window slots 134-1 to 134-13 are in sequential order in time, where the window slot 134-1 represents the oldest window slot in the sequence, the window slot 134-12 represents the most recent window slot in the sequence prior to the current window slot, and the window slot 134-13 represents the current window slot in the sequence, as shown with reference to the time line. Each of window slots 134-1 to 134-13 has a value of a duration of 15 minutes in the current example, and the rolling time window 120-1 in the current example has a duration value of 180 minutes.

Table 1 shows two example rules and associated rule parameters for corresponding evaluations of a rolling time window 120-1 and a current rolling time window 120-2, respectively, using the rules 126 of FIG. 1. In each example, the rolling time window 120-1 to be monitored by the CAES 102 has been defined to have a rolling time window duration of time, an invalid login attempts threshold, and a valid login attempts threshold for login attempts over the defined duration of the rolling time window. The rational for defining these rule parameters in this way for each example is also provided in Table 1.

TABLE 1

| Example No. | Duration of RTW | Invalid login attempts Threshold | Valid login attempts Threshold | Rational for Rule Parameters |
|---|---|---|---|---|
| 1 | 180 min | 100 | 3 | Basic rule to block ATO attacks by illegitimate users over a longer duration of time, while allowing legitimate users to be able to login |
| 2 | 15 min | 50 | 2 | Prevent/Block an illegitimate user from controlling a site over a short duration, while allowing a legitimate to login |

In example number 1, the duration of the rolling time window is 180 minutes, or 3 hours of time, and represents a longer time period to monitor for an ATO attack by an illegitimate user (also referred herein as a hacker). The invalid login attempts threshold is set to 100 invalid login attempts or errors to allow ATO attacks to be identified and prevented over the longer duration of time. The valid login attempts threshold in this example has been set to 3 valid login attempts to prevent the hacker from gaining access to the site with 1 or 2 successful attempts. This acknowledges that even though the hacker will have a very high number of failures in this brute force attack, sometimes the hacker will succeed. The valid login attempts attempts threshold has not been set too high to prevent legitimate users from having access to their accounts from being delayed, locked out or blocked. This basic rule window definition and rule blocks a hacker having more than a 100 failed login attempts from gaining access but at the same time allows a legitimate user to access the site if the user has at least 3 valid logins. It is noted that in some instances, counters may be global for all sites, while in others, those counters may be for specific sites as opposed to all sites, thus allowing quicker blocking and reducing potential memory space.

In example number 2, the rolling time window has been defined to have a much shorter duration of time and is set to 15 minutes, the invalid login attempts threshold has been set to 50 invalid login attempts, and the valid login attempts threshold has been set to 2 valid login attempts. If a hacker is controlling a site (e.g., a university site), and a legitimate user, such as a student, faculty member of alumni, is trying to login in this short period of time, this case should be allowed.

FIG. 2B shows example evaluations of the login attempts with the rolling time window 120-1 and the current rolling time window 120-2 using the rules 126 of FIG. 1. Example 1 is an example evaluation of the login attempts that results in the current login attempt being allowed, while example 2 is an example evaluation that results in the current login attempt being blocked. Both examples 1 and 2 include assumptions for values of a total failed count value, a total valid count value, failed login attempts, valid login attempts, a valid threshold, and a failed threshold. An allowance rule 127 and a block rule 128 of the rules 126, and evaluation results are also included in examples 1 and 2. For example 1, the evaluation result is that the login attempt is to be allowed by allowance rule 127 based on the assumptions and the rules 126 of example 1. Similarly, for example 1, the evaluation result is that the login attempt is to be blocked by block rule 128 based on the assumptions and the rules 126 of example 2.

Figure 3A:
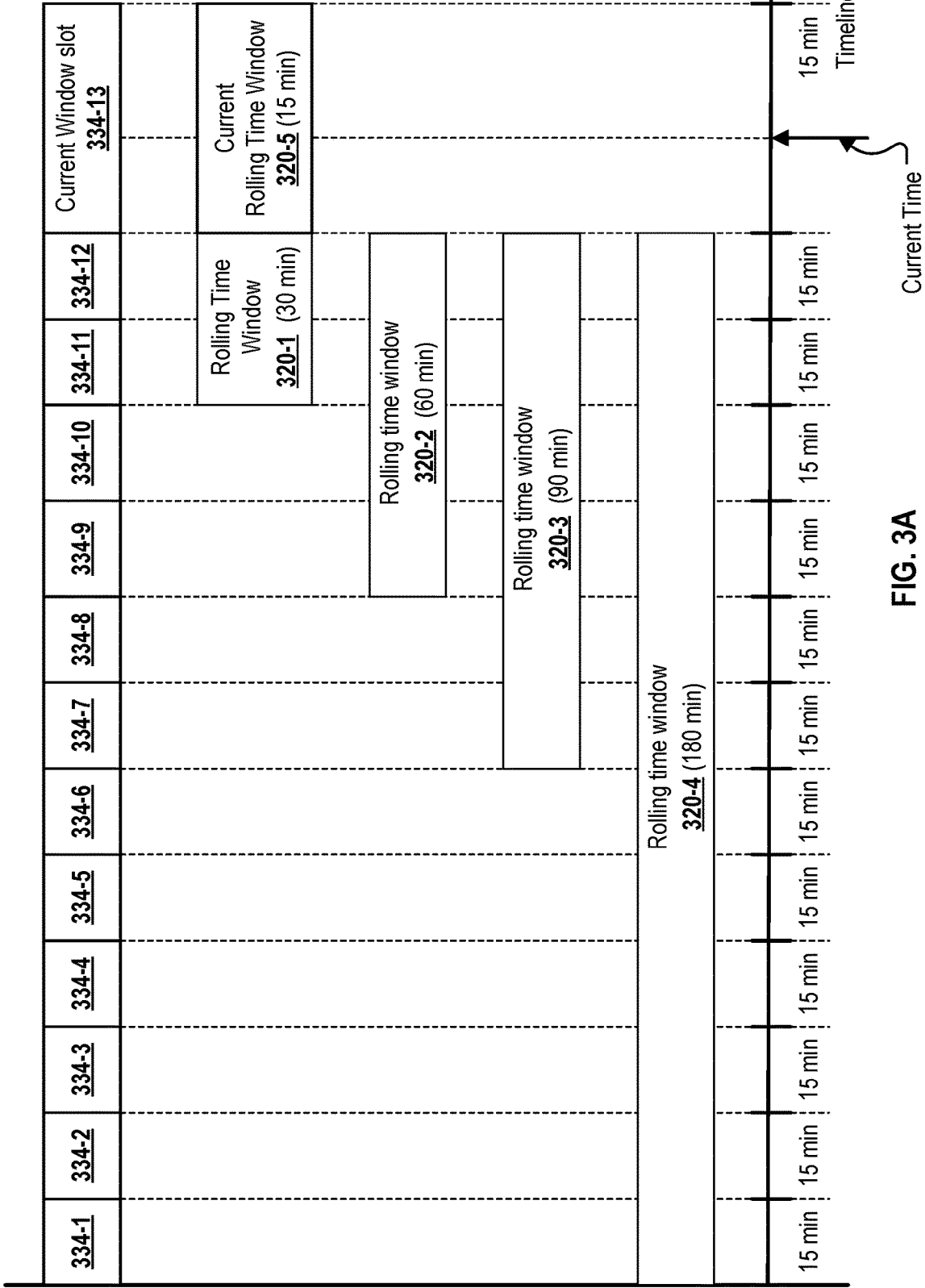
Figure 4A:
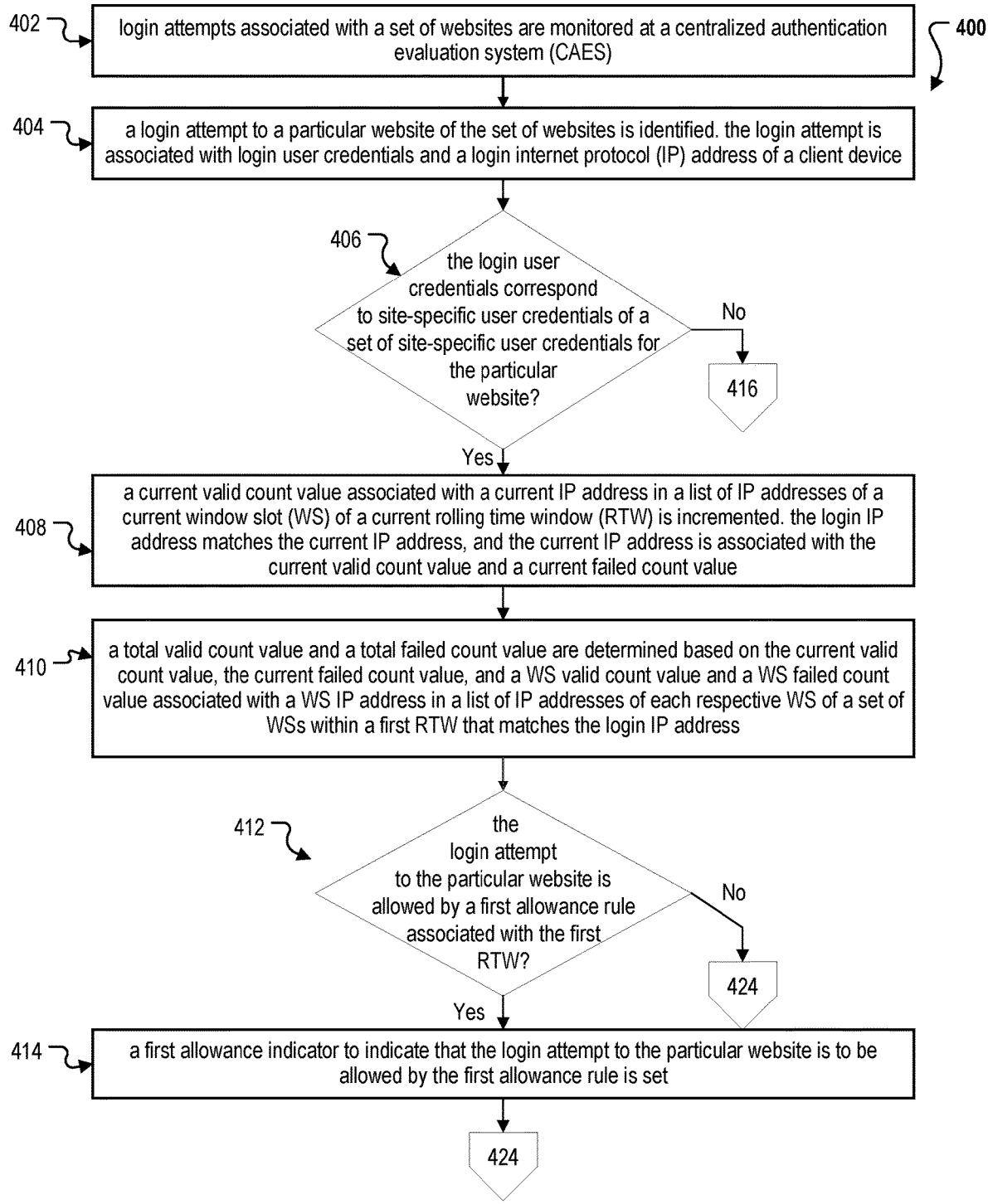
FIGS. 4A, 4B, 4C, and 4D illustrate an example flowchart of a computer-implemented method for identifying potential account take over fraud attacks through monitoring of user credential login attempts across a network of websites, according to an example implementation of the present disclosure.
Figure 4B:
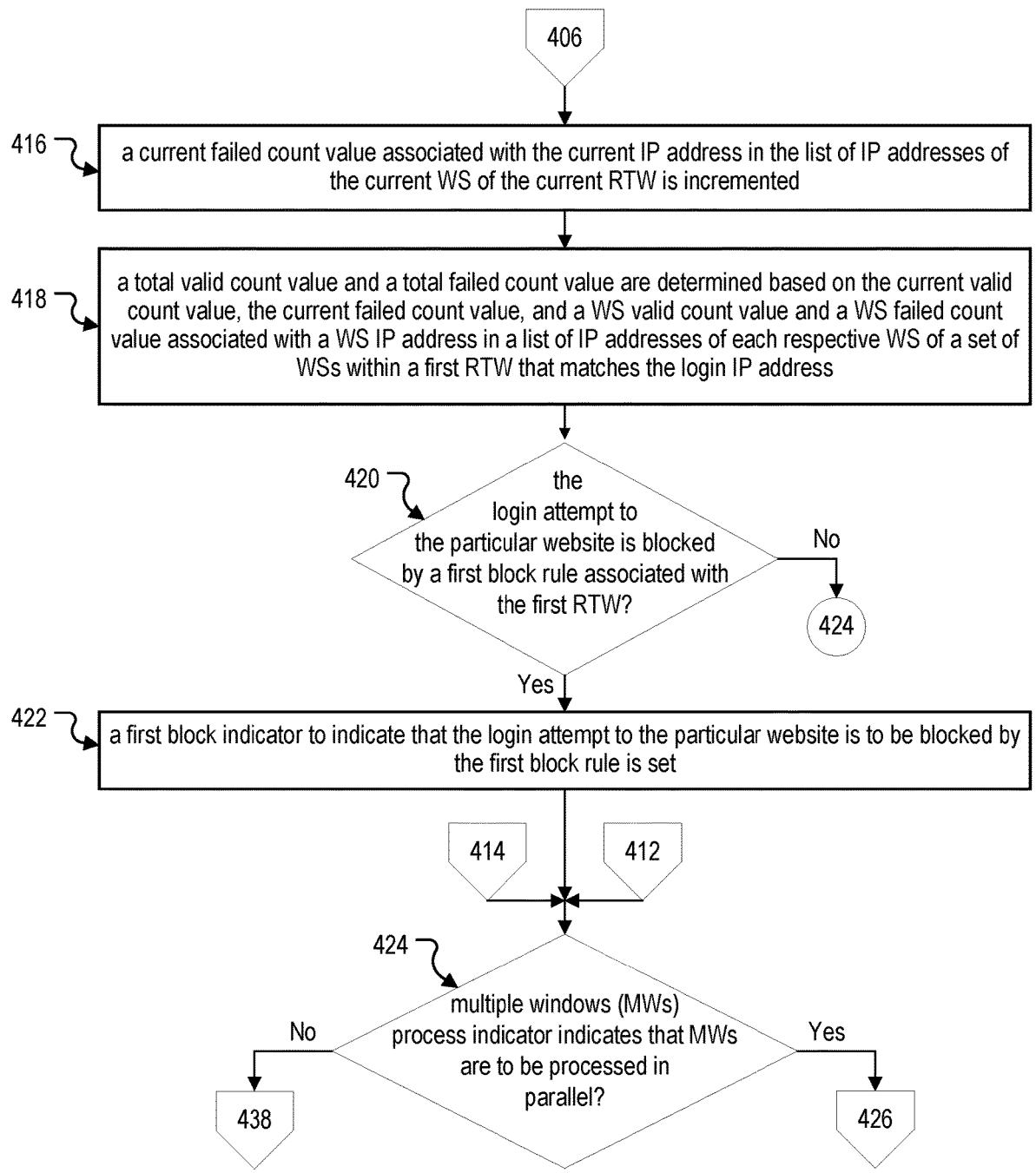
Figure 4C:
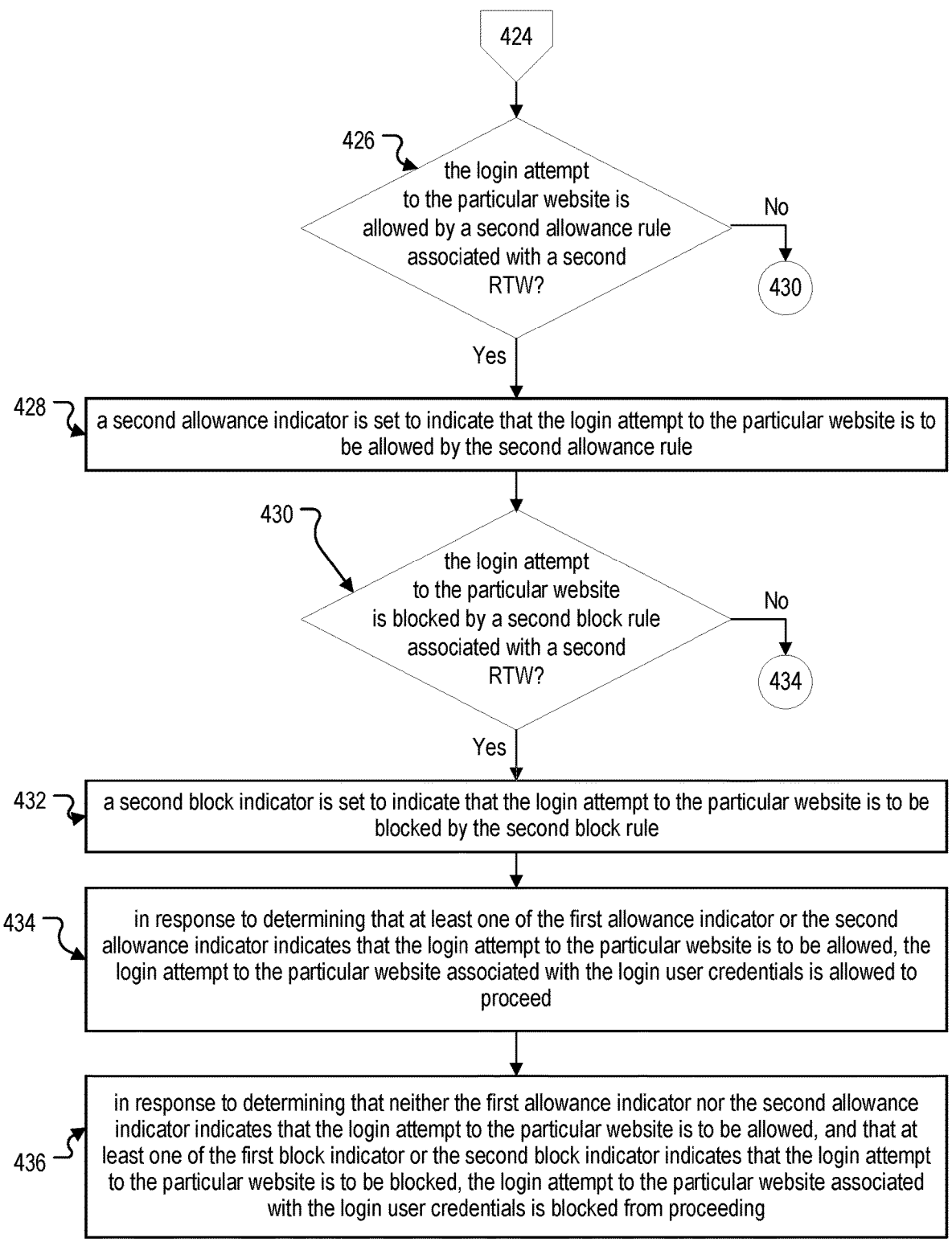
Figure 4D:
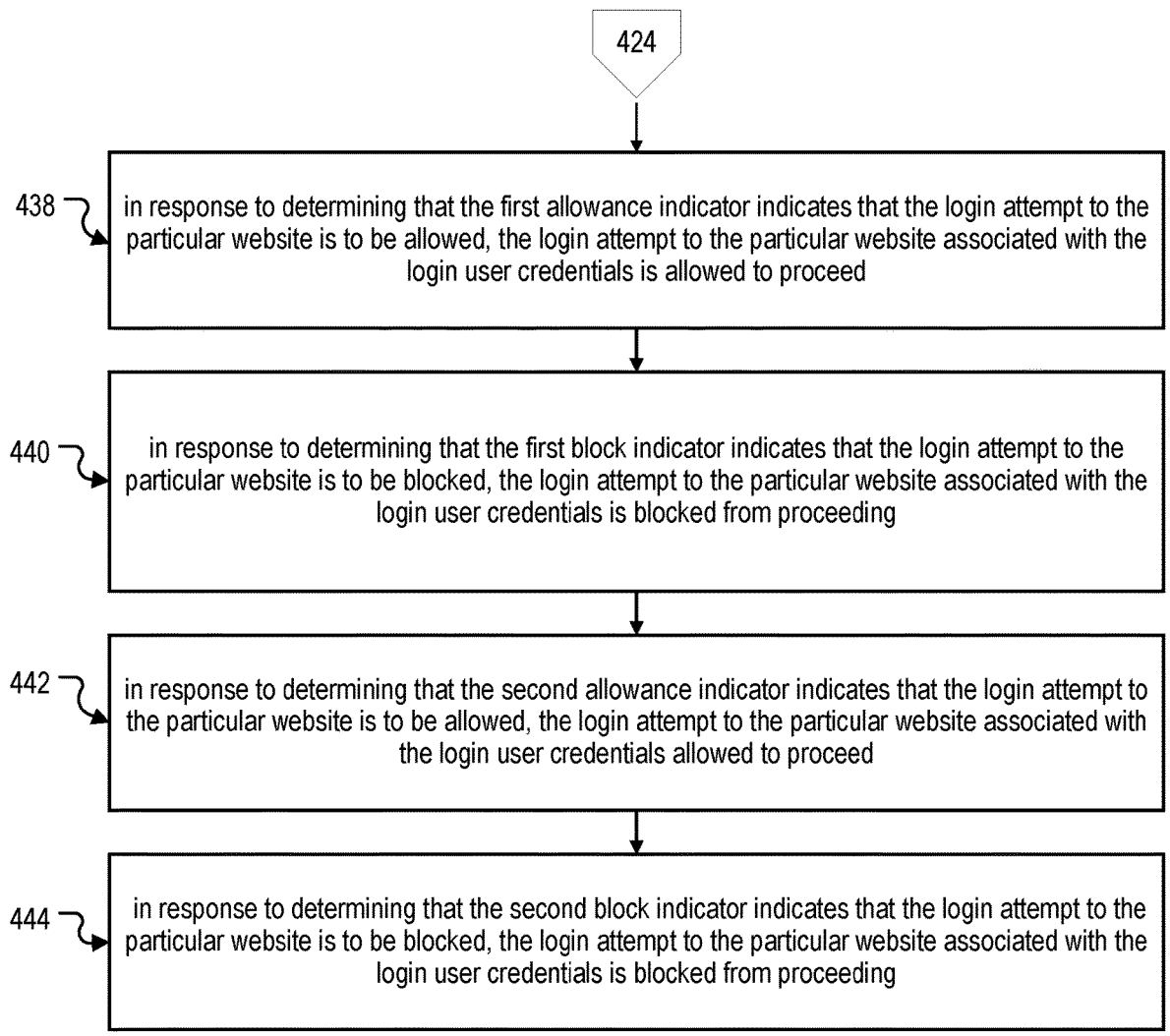

FIGS. 3A and 3B illustrate example evaluations to determine whether to allow or block a login attempt based on login user credentials, login IP addresses, allowance and block rules, and multiple rolling time windows history of successful and failure login behavior, according to an implementation of the present disclosure.

FIG. 3A shows rolling time windows 320-1 to 320-4, a current rolling time window 320-5, and window slots 334-1 to 334-13 that are similar to the rolling time window 120-1, the current rolling time window 120-2, and the window slots 134-1 to 134-13 of FIG. 2A, respectively. Window slots 334-1 to 334-13 each have a value of a duration of 15 minutes, and the rolling time windows 320-1, 320-2, 320-3, 320-4, and 320-5 have duration values of 30 minutes, 60 minutes, 90 minutes, 180 minutes, and 15 minutes, respectively.

FIG. 3B shows an example evaluation of the login attempts for the multiple rolling time windows 320-1 to 320-4 and the current rolling time window 320-5 using the rules 326-1 to 326-4 in parallel or sequentially. The results for the evaluation of the login attempts for each rolling time window 320-1 to 320-4 are determined using the rules 326-1 to 326-4, respectively, and the overall results for parallel evaluation of the login attempts and for sequential evaluation of the login attempts, are also shown. The example evaluations are similar to example 1 and example 2 of FIG. 2B. The assumptions for the values of total failed count values 344-13, total valid count values 342-13, failed login attempts, valid login attempts, valid thresholds 330-1 to 330-4, and failed thresholds 332-1 to 332-4, and the allowance rules 327-1 to 327-4 and the block rules 328-1 to 328-4 of the rules 326-1 to 326-4, respectively, are similar to the assumptions and the rules 126 of FIG. 2B. The evaluation results for the current login attempt for rolling time window 320-1, the attempt would have no action taken as neither the allowance rule 327-1 nor the block rule 328-1 indicated any action to be taken. For rolling time window 320-2, the attempt would be blocked by the block rule 328-2. For rolling time window 320-3, the attempt would be blocked by the block rule 328-3, and for rolling time window 320-4, the attempt would be allowed by the allowance rule 327-4.

When the rules 326 are processed in parallel, if at least one of the allowance rules 327-1, 327-2, 327-3, and 327-4, indicates that the current login attempt would be allowed, then the attempt is allowed to proceed. In this example of parallel processing, the login attempt is allowed to proceed because allowance rule 327-4 indicated that the attempt would be allowed to proceed.

When the rules 326 are processed sequentially one after the other, once a particular allowance rule 127 in the sequence indicates that the current login attempt would be allowed, the current login attempt would be allowed to proceed. Alternatively, or additionally, once a particular block rule 128 of the pair of rules 126 in the sequence indicates that the current login attempt would be blocked, the current login attempt would be blocked and not allowed to proceed. In this example of sequential processing, the login attempt is blocked and not allowed to proceed by the block rule 328-2. Processing the rules in parallel may result in a different outcome than processing the rules sequentially, as shown by these examples.

FIGS. 4A, 4B, 4C, and 4D illustrate an example flowchart of a computer-implemented method for identifying potential account take over fraud attacks through monitoring of user credential login attempts across a network of websites, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, login attempts associated with a set of websites are monitored at a centralized authentication evaluation system (CAES). From 402, method 400 proceeds to 404.

At 404, a login attempt to a particular website from the set of websites is identified. The login attempt is associated with login user credentials and a login IP address of a client device. From 404, method 400 proceeds to 406.

At 406, whether the login user credentials correspond to site-specific user credentials of a set of site-specific user credentials for the particular website is determined. In other words, a determination is made as to whether the attempted login corresponds to an existing valid set of user credentials. In response to determining that the login user credentials correspond to the site-specific user credentials, method 400 proceeds to 408. In response to determining that the login user credentials do not correspond to the site-specific user credentials, method 400 proceeds to 416.

At 408, a current valid count value associated with a current IP address in a list of IP addresses of a current window slot (WS) of a current rolling time window (RTW) is incremented. From 408, method 400 proceeds to 410.

At 410, a total valid count value and a total failed count value is determined based on the current valid count value, the current failed count value, and a WS valid count value and a WS failed count value associated with a WS IP address in a list of IP addresses of each respective WS of a set of WSs within a first RTW that matches the login IP address. Determining the total valid count value and the total failed count value may include setting the total valid count value to the current valid count value and the total failed count value to the current failed count value. Then, for each WS of the set of WSs within the first RTW, whether the login IP address matches a WS IP address in a list of IP addresses of a respective WS may be determined. In response to determining that the login IP address matches the WS IP address in the list of IP addresses of the respective WS, the WS valid count value may be added to the total valid count value and the WS failed count value may be added to the total failed count value. Each WS in the set of WSs comprises a duration (e.g., 15 minutes, 20 minutes, 1 hour, 1 day, etc.) and is managed by the CAES. From 410, method 400 proceeds to 412.

At 412, whether the login attempt to the particular website is allowed by a first allowance rule associated with the first RTW is determined. The login attempt is allowed by the first allowance rule if the total valid count value is greater than or equal to a valid count threshold of the first allowance rule and the total failed count value is greater than a failed count threshold of the first allowance rule. In response to determining that the login attempt to the particular website is allowed by the first allowance rule associated with the first RTW, method 400 proceeds to 414. In response to determining that the login attempt to the particular website is not allowed by the first allowance rule associated with the first RTW, method 400 proceeds to 424.

At 414, a first allowance indicator to indicate that the login attempt to the particular website is to be allowed by the first allowance rule is set. From 414, method 400 proceeds to 424.

At 416, the current failed count value associated with the current IP address in the list of IP addresses of the current WS of the current RTW is incremented. From 416, method 400 proceeds to 418.

At 418, a total valid count value and a total failed count value are determined based on the current valid count value, the current failed count value, and a WS valid count value and a WS failed count value associated with a WS IP address in a list of IP addresses of each respective WS of a set of WSs within a first RTW that matches the login IP address. From 418, method 400 proceeds to 420.

At 420, whether the login attempt to the particular website is blocked by a first block rule associated with the first RTW is determined. The login attempt is blocked by the first block rule if the total valid count value is less than the valid count threshold of the first block rule and the total failed count value is greater than the failed count threshold of the first block rule. In response to determining that the login attempt to the particular website is blocked by the first block rule, method 400 proceeds to 422. In response to determining that the login attempt to the particular website is not blocked by the first block rule, method 400 proceeds to 424.

At 422, a first block indicator to indicate that the login attempt to the particular website is to be blocked by the first block rule is set. From 422, method 400 proceeds to 424.

At 424, whether a multiple windows (MWs) process indicator of processing parameters 154 indicates that the MWs are to be processed in parallel is determined. In response to determining that the MWs process indicator indicates that the MWs are to be processed in parallel, method 400 proceeds to 426. In response to determining that the MWs process indicator does not indicate that the MWs are to be processed in parallel, the MWs are to be processed sequentially, and method 400 proceeds to 438.

At 426, whether the login attempt to the particular website is allowed by a second allowance rule associated with a second RTW is determined. In response to determining that the login attempt to the particular website is allowed by the second allowance rule, method 400 proceeds to 428. In response to determining that the login attempt to the particular website is not allowed by the second allowance rule, method 400 proceeds to 430.

At 428, a second allowance indicator is set to indicate that the login attempt to the particular website is to be allowed by the second allowance rule. From 428, method 400 proceeds to 430.

At 430, whether the login attempt to the particular website is blocked by a second block rule associated with the second RTW is determined. In response to determining that the login attempt to the particular website is blocked by the second block rule, method 400 proceeds to 432. In response to determining that the login attempt to the particular website is not blocked by the second block rule, method 400 proceeds to 434.

At 432, a second block indicator to indicate that the login attempt to the particular website is to be blocked by the second block rule is set. From 432, method 400 proceeds to 434.

At 434, in response to determining that at least one of the first allowance indicator or the second allowance indicator indicates that the login attempt to the particular website is to be allowed, the login attempt to the particular website associated with the login user credentials is allowed to proceed. From 434, method 400 proceeds to 436.

At 436, in response to determining that neither the first allowance indicator nor the second allowance indicator indicates that the login attempt to the particular website is to be allowed, and that at least one of the first block indicator or the second block indicator indicates that the login attempt to the particular website is to be blocked, the login attempt to the particular website associated with the login user credentials is blocked from proceeding. After 436, method 400 stops.

At 438, in response to determining that the first allowance indicator indicates that the login attempt to the particular website is to be allowed, the login attempt to the particular website associated with the login user credentials is allowed to proceed. From 438, method 400 proceeds to 440.

At 440, in response to determining that the first block indicator indicates that the login attempt to the particular website is to be blocked, the login attempt to the particular website associated with the login user credentials is blocked from proceeding. From 440, method 400 proceeds to 442.

At 442, in response to determining that the second allowance indicator indicates that the login attempt to the particular website is to be allowed, the login attempt to the particular website associated with the login user credentials is allowed to proceed. From 442, method 400 proceeds to 444.

At 444, in response to determining that the second block indicator indicates that the login attempt to the particular website is to be blocked, the login attempt to the particular website associated with the login user credentials is blocked from proceeding. After 444, method 400 stops.

Figure 5:
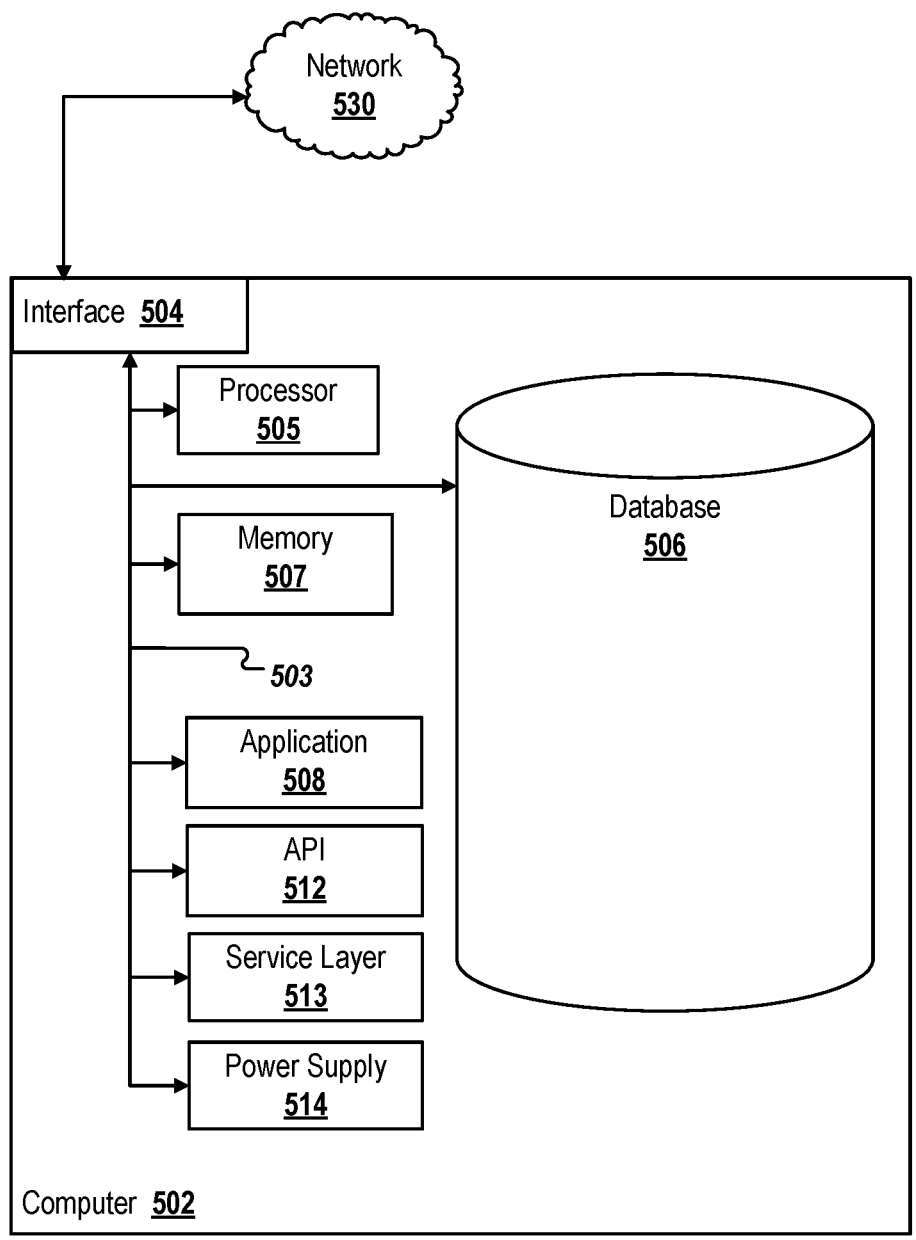
FIG. 5 is a block diagram illustrating an example of a computer-implemented system used to provide computational functionalities associated with described algorithms, methods, functions, processes, flows, and procedures, according to an example implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. The Computer 502 may include or encompass a portion of a cloud-based system. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: monitoring, at a centralized authentication evaluation system (CAES), login attempts associated with a set of websites; identifying a login attempt to a particular website of the set of websites, wherein the login attempt is associated with login user credentials and a login internet protocol (IP) address of a client device; determining whether the login user credentials correspond to site-specific user credentials of a set of site-specific user credentials for the particular website; and in response to determining that the login user credentials correspond to the site-specific user credentials: incrementing a current valid count value associated with a current IP address in a list of IP addresses of a current window slot (WS) of a current rolling time window (RTW), wherein the login IP address matches the current IP address, and wherein the current IP address is associated with the current valid count value and a current failed count value; determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determining whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and in response to determining that the login attempt to the particular website is allowed by the first allowance rule, setting a first allowance indicator to indicate that the login attempt to the particular website is to be allowed by the first allowance rule.

The foregoing and other described implementations can each, optionally, include one or more of the following features:

A first feature, combinable with any of the following features, wherein determining the total valid count value and the total failed count value comprises: setting the total valid count value to the current valid count value and the total failed count value to the current failed count value; and for each WS of the set of WSs within the first RTW: determining whether the login IP address matches a WS IP address in a list of IP addresses of a respective WS; and in response to determining that the login IP address matches the WS IP address in the list of IP addresses of the respective WS, adding the WS valid count value to the total valid count value and the WS failed count value to the total failed count value.

A second feature, combinable with any of the previous or following features, in response to determining that the login user credentials do not correspond to the site-specific user credentials: incrementing the current failed count value associated with the current IP address in the list of IP addresses of the current WS of the current RTW; determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determining whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and in response to determining that the login attempt to the particular website is blocked by the first block rule, setting a first block indicator to indicate that the login attempt to the particular website is to be blocked by the first block rule.

A third feature, combinable with any of the previous or following features, determining whether the login attempt to the particular website is allowed by a second allowance rule associated with a second RTW; and in response to determining that the login attempt to the particular website is allowed by the second allowance rule, setting a second allowance indicator to indicate that the login attempt to the particular website is to be allowed by the second allowance rule.

A fourth feature, combinable with any of the previous or following features, determining whether the login attempt to the particular website is blocked by a second block rule associated with the second RTW; and in response to determining that the login attempt to the particular website is blocked by the second block rule, setting a second block indicator to indicate that the login attempt to the particular website is to be blocked by the second block rule.

A fifth feature, combinable with any of the previous or following features, in response to determining that at least one of the first allowance indicator or the second allowance indicator indicates that the login attempt to the particular website is to be allowed, allowing the login attempt to the particular website associated with the login user credentials to proceed; and in response to determining that neither the first allowance indicator nor the second allowance indicator indicates that the login attempt to the particular website is to be allowed, and that at least one of the first block indicator or the second block indicator indicates that the login attempt to the particular website is to be blocked, blocking the login attempt to the particular website associated with the login user credentials from proceeding.

A sixth feature, combinable with any of the previous or following features, in response to determining that the first allowance indicator indicates that the login attempt to the particular website is to be allowed, allowing the login attempt to the particular website associated with the login user credentials to proceed; in response to determining that the first block indicator indicates that the login attempt to the particular website is to be blocked, blocking the login attempt to the particular website associated with the login user credentials from proceeding; in response to determining that the second allowance indicator indicates that the login attempt to the particular website is to be allowed, allowing the login attempt to the particular website associated with the login user credentials to proceed; and in response to determining that the second block indicator indicates that the login attempt to the particular website is to be blocked, blocking the login attempt to the particular website associated with the login user credentials from proceeding.

A seventh feature, combinable with any of the previous or following features, wherein the set of websites includes the particular website, and wherein the set of websites comprises one of: all registered websites in the centralized authentication evaluation system; all registered websites associated with a particular data center in the centralized authentication evaluation system; all registered websites associated with a particular customer in the centralized authentication evaluation system; all registered websites associated with a particular group of sites in the centralized authentication evaluation system; or a particular registered website in the centralized authentication evaluation system.

An eighth feature, combinable with any of the previous or following features, in response to determining that the login user credentials do not correspond to the site-specific user credentials and the login IP address does not exist in the list of IP addresses of the current WS: adding the login IP address to a new IP address entry in the list of IP addresses of the current WS, wherein the list of IP addresses is associated with the set of websites; and setting a failed count of the new IP address entry to a value of zero; and in response to determining that a duration of the current WS has been reached and the login IP address is in the list of IP addresses of the current WS: in response to determining that a number of WSs in the set of WSs is equal to a WSs threshold of the set of WSs, removing the oldest WS from the set of WSs based on a time each WS was added to the set of WSs; creating a new WS, comprising: setting a valid count of the new WS to the value of zero; adding each IP address entry in the current WS and each IP address entry in the set of WSs to a list of IP addresses in the new WS; setting a failed count of each IP address entry in the list of IP addresses in the new WS to the value of zero; adding the current WS as the most recent WS to the set of WSs; and assigning the new WS to the current WS.

In a second implementation, a computer-implemented system, comprising: at least one processor; a non-transitory computer-readable storage medium coupled to the at least one processor and storing programming instructions for execution by the at least one processor, wherein the programming instructions instruct the at least one processor to: monitor, at a centralized authentication evaluation system (CAES), login attempts associated with a set of websites; identify a login attempt to a particular website from the set of websites, wherein the login attempt is associated with login user credentials and a login internet protocol (IP) address of a client device; determine whether the login user credentials correspond to site-specific user credentials of a set of site-specific user credentials for the particular website; and in response to determining that the login user credentials correspond to the site-specific user credentials: increment a current valid count value associated with a current IP address in a list of IP addresses of a current window slot (WS) of a current rolling time window (RTW), wherein the login IP address matches the current IP address, and wherein the current IP address is associated with the current valid count value and a current failed count value; determine a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determine whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and in response to determining that the login attempt to the particular website is allowed by the first allowance rule, set a first allowance indicator to indicate that the login attempt to the particular website is to be allowed by the first allowance rule.

The foregoing and other described implementations can each, optionally, include one or more of the following features:

A first feature, combinable with any of the following features, wherein determining the total valid count value and the total failed count value comprises: set the total valid count value to the current valid count value and the total failed count value to the current failed count value; and for each WS of the set of WSs within the first RTW: determine whether the login IP address matches a WS IP address in a list of IP addresses of a respective WS; and in response to determining that the login IP address matches the WS IP address in the list of IP addresses of the respective WS, add the WS valid count value to the total valid count value and the WS failed count value to the total failed count value.

A second feature, combinable with any of the previous or following features, comprising: in response to determining that the login user credentials do not correspond to the site-specific user credentials: increment the current failed count value associated with the current IP address in the list of IP addresses of the current WS of the current RTW; determine a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determine whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and in response to determining that the login attempt to the particular website is blocked by the first block rule, set a first block indicator to indicate that the login attempt to the particular website is to be blocked by the first block rule.

A third feature, combinable with any of the previous or following features, comprising: determine whether the login attempt to the particular website is allowed by a second allowance rule associated with a second RTW; and in response to determining that the login attempt to the particular website is allowed by the second allowance rule, set a second allowance indicator to indicate that the login attempt to the particular website is to be allowed by the second allowance rule.

A fourth feature, combinable with any of the previous or following features, comprising: determine whether the login attempt to the particular website is blocked by a second block rule associated with the second RTW; and in response to determining that the login attempt to the particular website is blocked by the second block rule, set a second block indicator to indicate that the login attempt to the particular website is to be blocked by the second block rule.

A fifth feature, combinable with any of the previous or following features, comprising: in response to determining that at least one of the first allowance indicator or the second allowance indicator indicates that the login attempt to the particular website is to be allowed, allow the login attempt to the particular website associated with the login user credentials to proceed; and in response to determining that neither the first allowance indicator nor the second allowance indicator indicates that the login attempt to the particular website is to be allowed, and that at least one of the first block indicator or the second block indicator indicates that the login attempt to the particular website is to be blocked, block the login attempt to the particular website associated with the login user credentials from proceeding.

A sixth feature, combinable with any of the previous or following features, comprising: in response to determining that the first allowance indicator indicates that the login attempt to the particular website is to be allowed, allow the login attempt to the particular website associated with the login user credentials to proceed; in response to determining that the first block indicator indicates that the login attempt to the particular website is to be blocked, block the login attempt to the particular website associated with the login user credentials from proceeding; in response to determining that the second allowance indicator indicates that the login attempt to the particular website is to be allowed, allow the login attempt to the particular website associated with the login user credentials to proceed; and in response to determining that the second block indicator indicates that the login attempt to the particular website is to be blocked, block the login attempt to the particular website associated with the login user credentials from proceeding.

In a third implementation, a non-transitory, computer-readable medium storing one or more instructions executable by at least one processor to perform operations comprising: monitoring, at a centralized authentication evaluation system (CAES), login attempts associated with a set of websites; identifying a login attempt to a particular website of the set of websites, wherein the login attempt is associated with login user credentials and a login internet protocol (IP) address of a client device; determining whether the login user credentials correspond to site-specific user credentials of a set of site-specific user credentials for the particular website; and in response to determining that the login user credentials correspond to the site-specific user credentials: incrementing a current valid count value associated with a current IP address in a list of IP addresses of a current window slot (WS) of a current rolling time window (RTW), wherein the login IP address matches the current IP address, and wherein the current IP address is associated with the current valid count value and a current failed count value; determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determining whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and in response to determining that the login attempt to the particular website is allowed by the first allowance rule, setting a first allowance indicator to indicate that the login attempt to the particular website is to be allowed by the first allowance rule.

The foregoing and other described implementations can each, optionally, include one or more of the following features:

A first feature, combinable with any of the following features, wherein determining the total valid count value and the total failed count value comprises: setting the total valid count value to the current valid count value and the total failed count value to the current failed count value; and for each WS of the set of WSs within the first RTW: determining whether the login IP address matches a WS IP address in a list of IP addresses of a respective WS; and in response to determining that the login IP address matches the WS IP address in the list of IP addresses of the respective WS, adding the WS valid count value to the total valid count value and the WS failed count value to the total failed count value.

A second feature, combinable with any of the previous or following features, comprising: in response to determining that the login user credentials do not correspond to the site-specific user credentials: incrementing the current failed count value associated with the current IP address in the list of IP addresses of the current WS of the current RTW; determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address; determining whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and in response to determining that the login attempt to the particular website is blocked by the first block rule, setting a first block indicator to indicate that the login attempt to the particular website is to be blocked by the first block rule.

A third feature, combinable with any of the previous or following features, comprising: determining whether the login attempt to the particular website is allowed by a second allowance rule associated with a second RTW; and in response to determining that the login attempt to the particular website is allowed by the second allowance rule, setting a second allowance indicator to indicate that the login attempt to the particular website is to be allowed by the second allowance rule.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    monitoring, at a centralized authentication evaluation system (CAES), login attempts associated with a set of websites;
    identifying a login attempt to a particular website of the set of websites, wherein the login attempt is associated with login user credentials and a login internet protocol (IP) address of a client device;
    determining whether the login user credentials correspond to site-specific user credentials of a set of site-specific user credentials for the particular website; and
    in response to determining that the login user credentials correspond to the site-specific user credentials:
        incrementing a current valid count value associated with a current IP address in a list of IP addresses of a current window slot (WS) of a current rolling time window (RTW), wherein the login IP address matches the current IP address, and wherein the current IP address is associated with the current valid count value and a current failed count value;
        determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;
        determining whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and
        in response to determining that the login attempt to the particular website is allowed by the first allowance rule, setting a first allowance indicator to indicate that the login attempt to the particular website is to be allowed by the first allowance rule.

2. The computer-implemented method of claim 1, wherein determining the total valid count value and the total failed count value comprises:
    setting the total valid count value to the current valid count value and the total failed count value to the current failed count value; and
    for each WS of the set of WSs within the first RTW:
        determining whether the login IP address matches a WS IP address in a list of IP addresses of a respective WS; and
        in response to determining that the login IP address matches the WS IP address in the list of IP addresses of the respective WS, adding the WS valid count value to the total valid count value and the WS failed count value to the total failed count value.

3. The computer-implemented method of claim 1, comprising:
    in response to determining that the login user credentials do not correspond to the site-specific user credentials:
        incrementing the current failed count value associated with the current IP address in the list of IP addresses of the current WS of the current RTW;
        determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;
        determining whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and in response to determining that the login attempt to the particular website is blocked by the first block rule, setting a first block indicator to indicate that the login attempt to the particular website is to be blocked by the first block rule.

4. The computer-implemented method of claim 3, comprising:

determining whether the login attempt to the particular website is allowed by a second allowance rule associated with a second RTW; and in response to determining that the login attempt to the particular website is allowed by the second allowance rule, setting a second allowance indicator to indicate that the login attempt to the particular website is to be allowed by the second allowance rule.

5. The computer-implemented method of claim 4, comprising:

determining whether the login attempt to the particular website is blocked by a second block rule associated with the second RTW; and in response to determining that the login attempt to the particular website is blocked by the second block rule, setting a second block indicator to indicate that the login attempt to the particular website is to be blocked by the second block rule.

6. The computer-implemented method of claim 5, comprising:

in response to determining that at least one of the first allowance indicator or the second allowance indicator indicates that the login attempt to the particular website is to be allowed, allowing the login attempt to the particular website associated with the login user credentials to proceed; and in response to determining that neither the first allowance indicator nor the second allowance indicator indicates that the login attempt to the particular website is to be allowed, and that at least one of the first block indicator or the second block indicator indicates that the login attempt to the particular website is to be blocked, blocking the login attempt to the particular website associated with the login user credentials from proceeding.

7. The computer-implemented method of claim 5, comprising:

in response to determining that the first allowance indicator indicates that the login attempt to the particular website is to be allowed, allowing the login attempt to the particular website associated with the login user credentials to proceed;

in response to determining that the first block indicator indicates that the login attempt to the particular website is to be blocked, blocking the login attempt to the particular website associated with the login user credentials from proceeding;

in response to determining that the second allowance indicator indicates that the login attempt to the particular website is to be allowed, allowing the login attempt to the particular website associated with the login user credentials to proceed; and in response to determining that the second block indicator indicates that the login attempt to the particular website is to be blocked, blocking the login attempt to the particular website associated with the login user credentials from proceeding.

8. The computer-implemented method of claim 1, wherein the set of websites includes the particular website, and wherein the set of websites comprises one of:

all registered websites in the centralized authentication evaluation system;

all registered websites associated with a particular data center in the centralized authentication evaluation system;

all registered websites associated with a particular customer in the centralized authentication evaluation system;

all registered websites associated with a particular group of sites in the centralized authentication evaluation system; or a particular registered website in the centralized authentication evaluation system.

9. The computer-implemented method of claim 1, comprising:

in response to determining that the login user credentials do not correspond to the site-specific user credentials and the login IP address does not exist in the list of IP addresses of the current WS:

adding the login IP address to a new IP address entry in the list of IP addresses of the current WS, wherein the list of IP addresses is associated with the set of websites; and setting a failed count of the new IP address entry to a value of zero; and in response to determining that a duration of the current WS has been reached and the login IP address is in the list of IP addresses of the current WS:

in response to determining that a number of WSs in the set of WSs is equal to a WSs threshold of the set of WSs, removing the oldest WS from the set of WSs based on a time each WS was added to the set of WSs;

creating a new WS, comprising:

setting a valid count of the new WS to the value of zero;

adding each IP address entry in the current WS and each IP address entry in the set of WSs to a list of IP addresses in the new WS;

setting a failed count of each IP address entry in the list of IP addresses in the new WS to the value of zero;

adding the current WS as the most recent WS to the set of WSs; and assigning the new WS to the current WS.

10. A computer-implemented system, comprising:

at least one processor;

a non-transitory computer-readable storage medium coupled to the at least one processor and storing programming instructions for execution by the at least one processor, wherein the programming instructions instruct the at least one processor to:

monitor, at a centralized authentication evaluation system (CAES), login attempts associated with a set of websites;

identify a login attempt to a particular website from the set of webs ites, wherein the login attempt is associated with login user credentials and a login internet protocol (IP) address of a client device;

determine whether the login user credentials correspond to site-specific user credentials of a set of site-specific user credentials for the particular website; and in response to determining that the login user credentials correspond to the site-specific user credentials:

increment a current valid count value associated with a current IP address in a list of IP addresses of a current window slot (WS) of a current rolling time window (RTW), wherein the login IP address matches the current IP address, and wherein the current IP address is associated with the current valid count value and a current failed count value;

determine a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;

determine whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and in response to determining that the login attempt to the particular website is allowed by the first allowance rule, set a first allowance indicator to indicate that the login attempt to the particular website is to be allowed by the first allowance rule.

11. The computer-implemented system of claim 10, wherein determining the total valid count value and the total failed count value comprises:

set the total valid count value to the current valid count value and the total failed count value to the current failed count value; and for each WS of the set of WSs within the first RTW:
determine whether the login IP address matches a WS IP address in a list of IP addresses of a respective WS; and in response to determining that the login IP address matches the WS IP address in the list of IP addresses of the respective WS, add the WS valid count value to the total valid count value and the WS failed count value to the total failed count value.

12. The computer-implemented system of claim 10, comprising:

in response to determining that the login user credentials do not correspond to the site-specific user credentials:

increment the current failed count value associated with the current IP address in the list of IP addresses of the current WS of the current RTW;

determine a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;

determine whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and in response to determining that the login attempt to the particular website is blocked by the first block rule, set a first block indicator to indicate that the login attempt to the particular website is to be blocked by the first block rule.

13. The computer-implemented system of claim 12, comprising:

determine whether the login attempt to the particular website is allowed by a second allowance rule associated with a second RTW; and in response to determining that the login attempt to the particular website is allowed by the second allowance rule, set a second allowance indicator to indicate that the login attempt to the particular website is to be allowed by the second allowance rule.

14. The computer-implemented system of claim 13, comprising:

determine whether the login attempt to the particular website is blocked by a second block rule associated with the second RTW; and in response to determining that the login attempt to the particular website is blocked by the second block rule, set a second block indicator to indicate that the login attempt to the particular website is to be blocked by the second block rule.

15. The computer-implemented system of claim 14, comprising:

in response to determining that at least one of the first allowance indicator or the second allowance indicator indicates that the login attempt to the particular website is to be allowed, allow the login attempt to the particular website associated with the login user credentials to proceed; and in response to determining that neither the first allowance indicator nor the second allowance indicator indicates that the login attempt to the particular website is to be allowed, and that at least one of the first block indicator or the second block indicator indicates that the login attempt to the particular website is to be blocked, block the login attempt to the particular website associated with the login user credentials from proceeding.

16. The computer-implemented system of claim 14, comprising:

in response to determining that the first allowance indicator indicates that the login attempt to the particular website is to be allowed, allow the login attempt to the particular website associated with the login user credentials to proceed;

in response to determining that the first block indicator indicates that the login attempt to the particular website is to be blocked, block the login attempt to the particular website associated with the login user credentials from proceeding;

in response to determining that the second allowance indicator indicates that the login attempt to the particular website is to be allowed, allow the login attempt to the particular website associated with the login user credentials to proceed; and in response to determining that the second block indicator indicates that the login attempt to the particular website is to be blocked, block the login attempt to the particular website associated with the login user credentials from proceeding.

17. A non-transitory, computer-readable medium storing one or more instructions executable by at least one processor to perform operations comprising:
  monitoring, at a centralized authentication evaluation system (CAES), login attempts associated with a set of websites;
  identifying a login attempt to a particular website of the set of websites, wherein the login attempt is associated with login user credentials and a login internet protocol (IP) address of a client device;
  determining whether the login user credentials correspond to site-specific user credentials of a set of site-specific user credentials for the particular website; and
  in response to determining that the login user credentials correspond to the site-specific user credentials:
    incrementing a current valid count value associated with a current IP address in a list of IP addresses of a current window slot (WS) of a current rolling time window (RTW), wherein the login IP address matches the current IP address, and wherein the current IP address is associated with the current valid count value and a current failed count value;
    determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;
    determining whether the login attempt to the particular website is allowed by a first allowance rule associated with the first RTW, wherein the login attempt is allowed by the first allowance rule if the total valid count value is greater than or equal to a valid count threshold of the first allowance rule and the total failed count value is greater than a failed count threshold of the first allowance rule; and
    in response to determining that the login attempt to the particular website is allowed by the first allowance rule, setting a first allowance indicator to indicate that the login attempt to the particular website is to be allowed by the first allowance rule.

18. The non-transitory, computer-readable medium of claim 17, wherein determining the total valid count value and the total failed count value comprises:
  setting the total valid count value to the current valid count value and the total failed count value to the current failed count value; and
  for each WS of the set of WSs within the first RTW:
    determining whether the login IP address matches a WS IP address in a list of IP addresses of a respective WS; and
    in response to determining that the login IP address matches the WS IP address in the list of IP addresses of the respective WS, adding the WS valid count value to the total valid count value and the WS failed count value to the total failed count value.

19. The non-transitory, computer-readable medium of claim 17, comprising:
  in response to determining that the login user credentials do not correspond to the site-specific user credentials:
    incrementing the current failed count value associated with the current IP address in the list of IP addresses of the current WS of the current RTW;
    determining a total valid count value and a total failed count value based on the current valid count value, the current failed count value, and a WS valid count value and a WS failed count value associated with a WS IP address in a list of IP addresses of each respective WS of a set of WSs within a first RTW that matches the login IP address;
    determining whether the login attempt to the particular website is blocked by a first block rule associated with the first RTW, wherein the login attempt is blocked by the first block rule if the total valid count value is less than the valid count threshold of the first block rule and the total failed count value is greater than the failed count threshold of the first block rule; and
    in response to determining that the login attempt to the particular website is blocked by the first block rule, setting a first block indicator to indicate that the login attempt to the particular website is to be blocked by the first block rule.

20. The non-transitory, computer-readable medium of claim 19, comprising:
  determining whether the login attempt to the particular website is allowed by a second allowance rule associated with a second RTW; and
  in response to determining that the login attempt to the particular website is allowed by the second allowance rule, setting a second allowance indicator to indicate that the login attempt to the particular website is to be allowed by the second allowance rule.

* * * * *